United States Patent [19]
Smith

[11] 3,899,731
[45] Aug. 12, 1975

[54] VOLTAGE REGULATOR WITH CONTROLLED CURRENT

[75] Inventor: Forest D. Smith, St. Louis Park, Minn.

[73] Assignee: Electric Machinery Mfg. Company, Minneapolis, Minn.

[22] Filed: May 29, 1973

[21] Appl. No.: 364,865

[52] U.S. Cl. .................. 322/25; 322/27; 322/28; 322/75
[51] Int. Cl. ................... H02p 9/10; H02p 9/14
[58] Field of Search ............ 322/25, 27, 28, 73, 75, 322/86, 87

[56] References Cited
UNITED STATES PATENTS

| | | |
|---|---|---|
| 2,913,656 | 11/1959 | Bliss .................................. 322/25 |
| 3,254,293 | 5/1966 | Steinbruegge et al. ............ 322/28 X |
| 3,351,843 | 11/1967 | Tipton ............................... 322/28 |
| 3,474,323 | 10/1969 | Kilgore et al. .................... 322/28 X |
| 3,564,391 | 2/1971 | Dinger .............................. 322/27 X |
| 3,634,750 | 1/1972 | Bobo ................................. 322/28 X |
| 3,758,843 | 9/1973 | Ishizaki et al. .................... 322/28 |

FOREIGN PATENTS OR APPLICATIONS

| | | | |
|---|---|---|---|
| 711,397 | 6/1954 | United Kingdom .................. 322/25 |
| 1,070,387 | 2/1953 | France ............................. 322/25 |

*Primary Examiner*—J. D. Miller
*Assistant Examiner*—Robert J. Hickey
*Attorney, Agent, or Firm*—Merchant, Gould, Smith & Edell

[57] ABSTRACT

A voltage regulating system for AC generators including a three phase current boost and a voltage responsive control circuit having a full converter type output stage. The three phase boost circuit and the full converter output stage are connected in series with the field winding of the exciter. At high power output levels, the inverting capability of the full converter power stage is used to oppose the voltage generated by the current boost to prevent loss of control over the generator, by diverting excessive boost currents through a load means connected to the current boost circuit.

10 Claims, 4 Drawing Figures

VOLTAGE REGULATOR WITH CONTROLLED CURRENT

BACKGROUND OF THE INVENTION

The present invention pertains generally to the field of voltage control systems for generators, and more particularly to the field of voltage regulating systems utilizing current boost.

In many systems of the type in which a voltage responsive control circuit connected to the output of the generator provides necessary field excitation current for the generator, it has been found to be advantageous or necessary to supplement this voltage responsive control component by the addition of a output current responsive control component. Such a requirement arises where it is necessary to provide a short circuit sustaining capability in order to clear circuit breakers during fault conditions. During a short circuit condition, the input voltage provided to a conventional shunt type voltage regulator is reduced to zero, making it impossible for the regulator to supply the excitation current necessary to clear the breakers. To overcome this problem, current boost transformers are used on the output of the generator to provide a signal indicative of the current output of the generator. Means are then provided for combining the voltage sensing component and the current sensing component to generate a required DC field current to the exciter.

Certain complexities and operational limitations have resulted from the prior art means for combining these two control components. A portion of the complexity results from the fact that, although single phase voltage sensing regulation is usually adequate, it is generally desirable to provide three phase current boost in order to cover a short circuit condition on any of the phases. Considering the AC or output side of the generator, it is generally not possible to combine the outputs of a three phase boost transformer and a single phase voltage sensing regulator. Rather, on the AC side of the regulator, it is necessary to combine a three phase voltage sensing regulator with a three phase boost transformer, which leads to a rather complex and costly circuit.

In order to avoid these complexities, a three phase boost transformer has been combined with a single phase voltage sensing regulator on the DC or output side of the regulator. This has been accomplished in the prior art by connecting the output of the three phase boost transformer to a diode rectifier bridge, and by connecting the output of the diode rectifier bridge in parallel with the DC output of a single phase voltage sensing shunt type regulator. This prior art arrangement has worked well in some applications, but it suffers from limitations which make it unsuitable for other applications. For example, in the case of low short circuit ratio generators, the required field current at a short circuit current of 300 per cent of rated current can result in a boost circuit which produces excessive boost currents when the generator is operating near 100 per cent of rated loads. To compensate for the excessive boost output, the voltage sensing regulator can reduce its output to zero, but this will not prevent loss of voltage regulator control if the boost output exceeds the exciter field requirements.

The present invention solves the foregoing problems with prior art devices, by providing an improved regulating system wherein a current boost circuit is combined with a voltage regulating circuit in a manner so that both excessive complexity and the danger of loss of control at outputs near 100 per cent of rated output are avoided. The use of a particular type of voltage regulating circuit, load means, and a series connection of the voltage regulating circuit and the current boost circuit results in operation wherein voltage regulating circuit can reverse polarity to oppose the boost current and thereby divert it into the load means, whenever the boost current becomes excessive. According to the present invention, voltage regulator systems are provided using either single or multiple phase boosts, with either a single or multiple phase voltage regulating circuit, and the systems can be used to directly energize the field winding of a geneator, or the field winding of an exciter for the generator.

SUMMARY OF THE INVENTION

According to the present invention, there is provided an improved voltage regulating system including current boost means, which includes means for preventing overexcitation of the generator field due to excessive current boost. The system comprises voltage responsive means and current responsive means both associated with the output of the generator, the voltage responsive means having a full SCR converter output stage for producing control signals in response to the generator output voltage, and the current responsive means for producing boost signals indicative of the current output of the generator. The voltage responsive means and the current responsive means are connected in series with the field of the generator, or, if the generator has an exciter, in series with the field of the exciter. A load element is connected in parallel with a current responsive means. If the boost signals become excessive, the output polarity of the voltage responsive means is reversed to oppose the boost signals, thereby diverting them to the load means. In one embodiment, the load means may be a resistor, and in another embodiment the load means may be linear reactors.

DESCRIPTION OF THE PREFERRED EMBODIMENT

Figure 1:
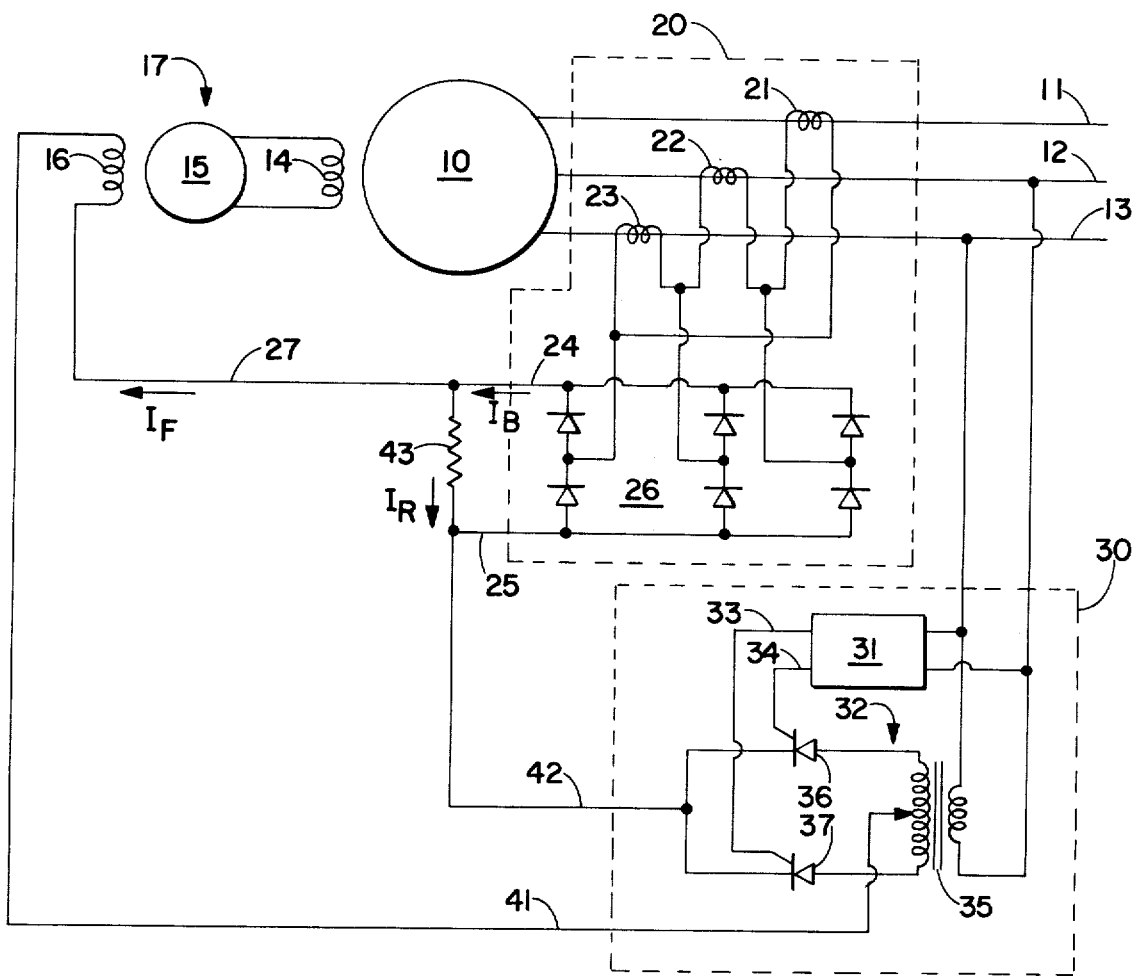
FIG. 1 is a schematic diagram of the preferred embodiment of the present invention.

In FIG. 1, reference numeral 10 designates a three phase alternating current generator, having three phase output lines 11, 12 and 13. Excitation of generator 10 is supplied by field energizing means 17. In some embodiments, field energizing means 17 may comprise only the generator field winding. In other embodiments, such as shown in FIG. 1, field energizing means 17 comprises exciter 15 which has its own field coil 16, and which is connected to field coil 14 of generator 10.

The voltage regulating system according to the present invention functions to sense the output voltage of generator 10, and to provide the field currents necessary to maintain the output of the generator at a constant voltage. The voltage regulating system also contains the current boost circuit for providing a short circuit sustaining capability for clearing circuit breakers.

Broken line 20 generally designates the current responsive means, or boost circuit, for producing current boost signals. The current responsive means comprises a three phase current boost transformer having secondary windings 21, 22 and 23, associated respectively with output leads 11, 12 and 13 of generator 10. Alternatively, three separate single phase transformers could be used.

The output currents from the boost transformer are rectified by a diode bridge circuit 26 which comprises three diode branch elements connected between a common cathode lead 24, and a common anode lead 25. Each branch comprises two series connected diodes, the junction between the diodes of the pair being connected to the appropriately sensed leads of the pair of the secondary windings of the current boost transformer, as shown in FIG. 1. The constructional details and operation of the three phase current boost transformer and diode bridge as such are well known in the art and form no part of the present invention. It is sufficient to indicate here that current responsive means 20 produces boost signals across terminal 24 and 25 which are indicative of the current output of generator 10. As the current output increases, the voltage induced in the secondaries of the boost transformer is increased, and the rectified DC voltage appearing across terminals 24, 25 correspondingly increases.

Dotted line 30 generally designates the voltage responsive means, or voltage regulating circuit, which functions to produce field control signals in response to the output voltage of the generator. In the embodiment shown in FIG. 1, voltage responsive means 30 is a single phase device, but the same principle of operation could be extended to a three phase voltage responsive device. Voltage responsive means 30 includes a control section indicated by block 31, and an output section 32. Output section 32 includes the output controlled rectifiers which supply the control signals to the field of the exciter for controlling the operation thereof. Control circuit 31 supplies the necessary drive signals to the gates of the rectifiers, and may include a voltage reference, a voltage comparison circuit, and driving circuits for the SCR's. Leads from two of the phases, such as 12 and 13 are applied to the input of control circuit 31, and gating signals for the SCR's are supplied by control circuit 31 via leads 33 and 34. The input voltage is also applied to the primary of the transformer 35, for providing power to the output circuit. The secondary winding of transformer 35 has a center tap connected to lead 41, and the ends of the secondary are connected respectively to the anodes of silicon controlled rectifiers 36 and 37. The cathodes of SCR's 36 and 37 are connected together to lead 42.

Voltage regulating circuit 30 is a full converter regulator, and has the capability of operating in an inverted mode for reversing its output polarity. Voltage regulators of this type are known in the prior art, and have been used in voltage regulating system for improved transient response, where their inverting mode is used to reduce field currents very quickly upon removal of a large load from the generator. The present invention incorporates a prior art full converter voltage regulating circuit in novel combination with other circuit elements to provide a new and useful result. Specifically, the inverting capability of the voltage regulating circuit 30 is used in the present invention to control and oppose excessive currents which are produced by the boost circuit 20 when generator 10 is operating near 100 per cent of rated output.

Since the field winding 16 of exciter 15 represents a highly inductive load, it is necessary to provide a path for the induced, or free-wheeling current therein. In shunt type voltage regulators this is ordinarily accomplished by connecting a commutating, or free-wheeling, diode in parallel with the exciter field. However, in full converter output stage 32, no commutating diode is used, and it is therefore necessary that each of the SCR's 36 and 37 remain on for 180° so that a path for the self-induced current is provided through lead 41, the secondary of transformer 35, SCR 36 or 37 and lead 42. The amount of power delivered by output stage 32 to field winding 16 may be regulated by controlling the phase angle of the firing signals delivered to the SCR's by controller 31. When SCR 36 is fired at the start of the phase cycle, and when SCR 37 is fired at the 180° point, maximum power is delivered to the field. When the firing points for the SCR's are delayed from the zero degree point and 180° point, respectively, less power is delivered to the field, but each SCR will remain on for an entire half cycle, even after polarity reversal of the output signal to transformer 35, because the self-induced voltage of field 17 maintains the SCR in conduction until the other SCR is fired. Of course it is necessary that controller 31 be designed so as to provide a certain minimum firing angle to both SCR's, to insure that both SCR's will be fired on every cycle.

As an example, assume that the instantaneous load and operating conditions of generator 10 require that only a portion of the total available field current from output stage 32 be applied to exciter field 16. At such time, controller 31 waits the necessary length of time before supplying a firing pulse via lead 34 to the gate of SCR 36. Assume that the firing angle is 45° (all phase angles being with reference to the phase of the applied voltage to the voltage responsive means 30). SCR 36 begins to conduct and continues to conduct, delivering power from transformer 35 through lead 32, diode bridge 26, lead 27, field 16 and lead 41. SCR 36 continues to conduct through the 180° phase point, at which time the applied voltage reverses. However, this reversal of applied voltage does not turn off SCR 36 because the self-inductance of field 16 keeps SCR 36 on and the field current circulating. At a phase angle of 225°, controller 31 fires SCR 37 which then provides the field current path, and SCR 36 turns off. During the interval from phase angle 180° to 225°, the voltage responsive means 30 is operating in its inverted mode, which means that it provides a negative output voltage, measured from lead 42 with respect to 41, and delivers power from the field back through transformer 35 to the source. If the firing angle is delayed even further, past 90°, the output voltage at lead 42 will be even more negative, resulting in a net flow of power from field 16 to the source.

In the embodiment of FIG. 1, a resistor 43 comprises the load means. Resistor 43 is connected across diode bridge 26, from common anode lead 25 to common cathode lead 24. The purpose of resistor 43 is to dissipate boost currents produced by boost circuit 20 which are in excess of the required field current. Excessive voltages produced by the current boost transformer and diode bridge are opposed by the series connected voltage regulating circuit operating in its inverting mode, to divert the excessive currents through resistor 43.

Figure 2:
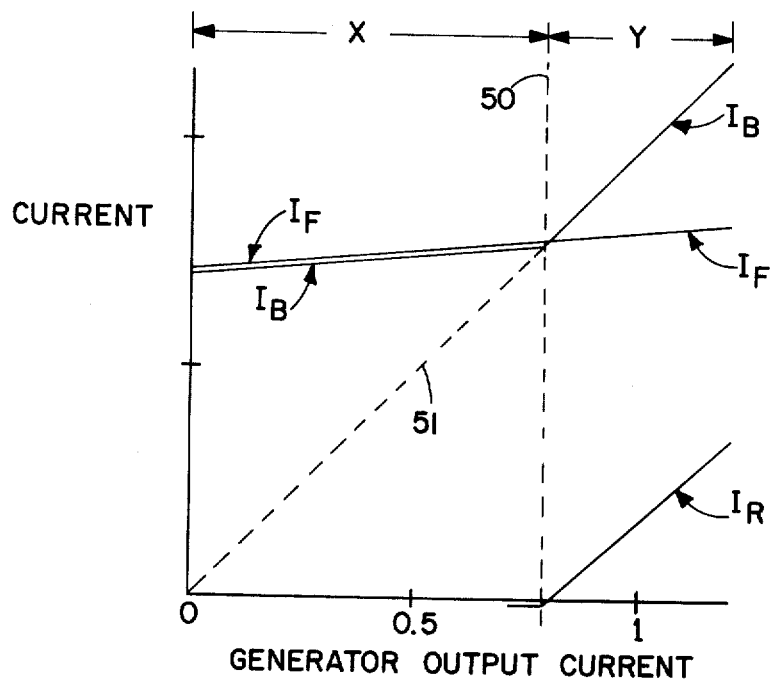
FIG. 2 is a graph showing the operation of the circuit of FIG. 1.
Figure 3:
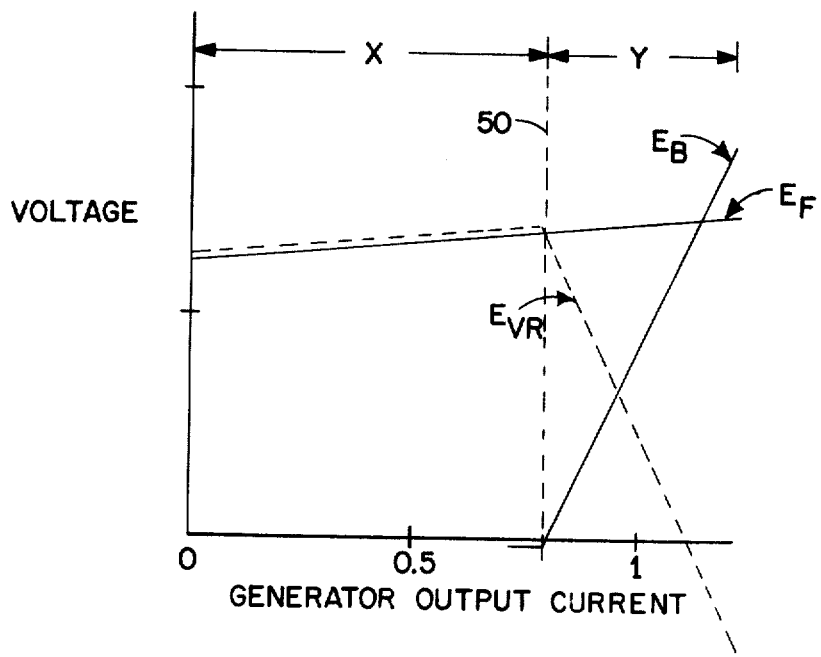
FIG. 3 is a graph further illustrating the operation of the circuit of FIG. 1.

The operation of the regulating system of FIG. 1 will be explained with reference to the graphs of FIGS. 2 and 3. In both figures, the horizontal axis represents the per unit current output current of generator 10 of FIG. 1, with the number 1 presenting 100 per cent of full rate power. In FIG. 2, the vertical axis represents current. Three curves are shown, identified as $I_F$, $I_B$, and $I_R$. $I_F$ is the current through field 16 of FIG. 1; $I_B$ is the boost current; and, $I_R$ is the current through resistor 43, as indicated by the three current arrows in FIG. 1. In FIG. 3, the vertical axis represents voltage, and the three curves represent voltages as follows. $E_{VR}$ is the voltage output of the voltage regulating section, measured at lead 42, with respect to lead 41. $E_B$ is the voltage across the boost section, measured at lead 24, with respect to lead 25. $E_F$ is the voltage across field 16, which by definition equals the sum of the $E_{VR}$ and $E_B$, since the current responsive means 20 and the voltage responsive means 30 are connected in series.

Both FIGS. 2 and 3 have the same horizontal scale, and both graphs are broken into two portions by a vertical broken line 50, which divides the graphs into two regions, labeled X and Y.

In FIG. 2, curve $I_F$ is the required field current in order to maintain the desired constant output voltage from the generator as a function of increasing generator output current. The actual field current is, by definition, $I_B$ minus $I_R$, which equals the current through the voltage regulating circuit. In region X, for relatively low generator output levels, the required field current $I_F$ is supplied primarily from voltage regulating circuit 30. The output from the voltage regulating circuit forward biases diodes or bridge 26, then flows through the bridge and field 16. In region X, the current supplied by the voltage regulating circuit is more than enough to satisfy the current being supplied by the boost transformer, so diode bridge 26 remains forward biased. Dotted line 51 is included in FIG. 2 merely to indicate what the output current from the boost circuit would be if it were connected to the field by itself, without voltage regulating circuit 30. Since the diodes of diode bridge 26 are forward biased, the small forward bias voltage drop existing across leads 25, 24, causes a small negative current to flow through resistor 43, as shown in FIG. 2. The difference then between $I_B$ and $I_R$ (which is a negative quantity) equals the required field current $I_F$. As indicated in FIG. 3, in region X the output voltage $E_{VR}$ from voltage responsive means 30 is positive, and equals the voltage across the field, less the small forward biased diode drop $E_B$.

At the generator output current indicated by line 50, the current supplied by the boost exceeds the requirements of the field. The axact per unit output current at which this occurs of course depends upon the design of the individual system and the value of the components used therein. At this point, diode bridge 26 is no longer forward biased, but becomes reversed biased while the current boost transformer delivers increasingly larger signals. This is indicated in FIGS. 2 and 3 by the increasing $I_B$ and $E_B$ curves in region Y. But as $E_B$ begins to increase, $E_{VR}$ begins to decrease and finally goes negative to oppose the rise of $E_B$, so that the net power applied to the field does not become excessive. As $E_B$ rises, the current $I_R$ which is in parallel with the output of current responsive means 20, necessarily increases proportionally, as indicated by the $I_R$ curve in FIG. 2. The slope of the curve for $E_{VR}$ in region Y of FIG. 3 is determined by the value of resistor 43; a larger value of resistance results in a steeper slope.

The excessive boost current is thus dissipated by diversion through resistor 43, so that the field current $I_F$ does not exceed requirements, and control over the generator by the voltage control system is maintained. Of course in the case of a short circuit condition, the input voltage to voltage regulating circuit 30 is reduced to zero, rendering it inoperative, so that the current boost circuit can supply the necessary sustaining current to clear breakers.

Figure 4:
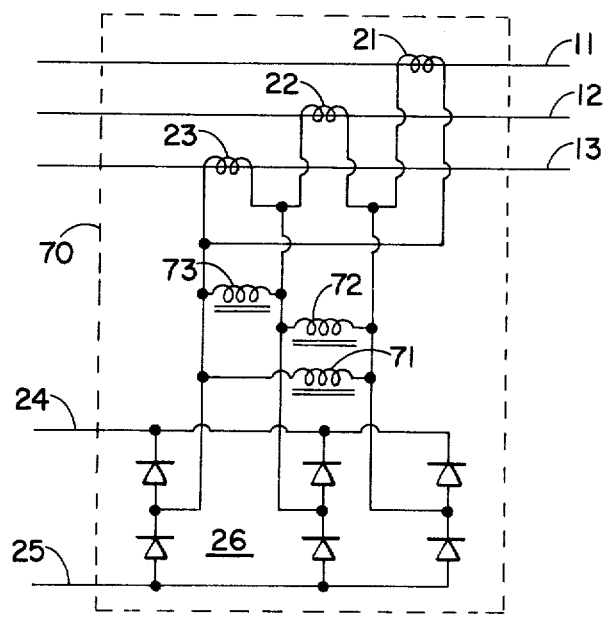
FIG. 4 is a schematic diagram showing alternate load means for use with the circuit of FIG. 1.

In FIG. 4 an alternate embodiment of the voltage regulating system according to the present invention is shown, using reactors instead of a resistor as the load means. In FIG. 4, broken line 70 generally indictes the alternate current responsive means which replaces current responsive means 20 of FIG. 1. Current responsive means 70 comprises a three phase current boost transformer having secondaries 21, 22 and 23 associated respectively with output phases 11, 12 and 13 of generator 10, the same as in FIG. 1. Current responsive means 70 also has a diode bridge 26 identical to the one in FIG. 1. Diode bridge 26 of FIG. 4 has a common cathode lead 24 and a common anode lead 25. In the emobiment of FIG. 4, lead 25 connects to lead 42 of FIG. 1, and lead 24 connects to lead 27 of FIG. 1. Load resistor 43 is omitted from the embodiment using the current responsive means 70 of FIG. 4.

In place of a resistive load means, the embodiment of FIG. 4 uses reactors 71, 72 and 73 which are connected respectively in parallel with secondaries 21, 22 and 23 of the current boost transformer.

Reactors 71, 72 and 73 preferably have air gaps in their magnetic circuits, and preferably should be linear at least up to the value of field voltage required to support a three per unit short circuit condition. The saturation level of the reactors should be at or above the saturation level of the current boost transformer.

The embodiment of FIG. 4 operates much the same as the embodiment of FIG. 1, described above. At low power output levels of generator 10 the diode bridge is forward biased and the voltage regulating circuit 30 provides the current for energizing the field 16. At increasing power levels, the current provided by the boost transformer increases until it exceeds the field requirements. At this point voltage regulating circuit 30, operating in its inverting mode, opposes the excessive boost and diverts the excessive currents through reactors 71–73. Air gap reactors are preferred, so that they do not saturate too quickly, which would result in too steep a slope of the voltage regulating circuit output curve.

The embodiment of FIG. 1, using a resistor as the load means is preferred in low power applications, because fewer components are required, resulting in a less expensive circuit. However, in high power generating applications, the currents dissipated through the resistor become excessive, and it is therefore advantageous in such systems to use the reactor load means embodiment of FIG. 4.

I claim:

1. A voltage regulating system for a generator having field energizing means, comprising:

a. voltage responsive means connected to the output of the generator, for producing field energizing control signals in response thereto to maintain the output voltage of the generator at a predetermined level, said voltage reference means including a full converter output circuit;

b. current responsive means associated with the output of the generator for producing boost signals in response to the current output of the generator;

c. means connecting said full converter output circuit and said current sensing means in series circuit with said field energizing means of said generator;

d. load means connected to said current sensing means; and e. said voltage responsive means operable in response to excessive boost signals to adjust said control signals to divert the excessive boost signals through said load means, thereby preventing loss of regulator control.

2. Apparatus according to claim 1 wherein said current sensing means comprises a current boost transformer and a rectifier bridge circuit connected thereto.

3. Apparatus according to claim 2 wherein said load means comprises a resistor connected across said diode bridge.

4. Apparatus according to claim 2 wherein said load means comprises a reactor connected across the secondary of said boost transformer.

5. Apparatus according to claim 2 wherein said current boost transformer comprises a three phase transformer having secondary windings associated with each output phase of the generator, and wherein said rectifier bridge circuir comprises a three phase diode bridge.

6. Apparatus according to claim 5 wherein said voltage responsive means comprises a single phase voltage regulating circuit.

7. An improved voltage regulating system for a three phase alternating current generator having an exciter, comprising:

a. a voltage regulating circuit connected to sense the output voltage of the generator, for producing exciter control signals in response thereto, said voltage regulating circuit including a full converter power circuit which includes a transformer having a primary winding connected across two of the output phases of the generator and a center tapped secondary winding, and first and second controlled rectifiers having anodes connected respectively to the first and second ends of said secondary winding;

b. a current boost circuit associated with the output of said generator for producing boost signals in response to the output current thereof, said current boost circuit comprising a three phase current boost transformer associated with the output of said generator and a rectifier bridge connected to said current boost transformer, said rectifier bridge having a common anode terminal and a common cathode terminal;

c. first connecting means for connecting the cathodes of said first and second controlled rectifiers to the common anode terminal of said bridge;

d. second connecting means for connecting the common cathode terminal of said bridge to the field winding of said exciter;

e. third connecting means for connecting said center tap to said field winding of said exciter; and f. a load resistor connected between said common cathod and said common anode terminals of said bridge.

8. An improved voltage regulating system for a three phase alternating current generator having an exciter, comprising;

a. a voltage regulating circuit connected to sense the output voltage of the generator, for producing exciter control signals in response thereto, said voltage regulating circuit including a full converter power circuit which includes a transformer having a primary winding connected across two of the output phases of the generator and a center tapped secondary winding, and first and second controlled rectifiers having anodes connected respectively to the first and second ends of said secondary winding;

b. a current boost circuit associated with the output of said generator for producing boost signals in response to the output current thereof, said current boost circuit including a current boost transformer having three secondary windings associated with the three phase outputs of the generator and a rectifier bridge connected to the secondary windings of the current boost transformer, said rectifier bridge having a common anode terminal and a common cathode terminal;

c. first connecting means for connecting the cathodes of said first and second controlled rectifiers to the common anode terminal of said bridge;

d. second connecting means for connecting the common cathode terminal of said bridge to the field winding of said exciter;

e. third connecting means for connecting said center tap to said field winding of said exciter; and f. reactor means connected in parallel with the secondary windings of said current boost transformer for receiving excessive boost signals diverted therethrough by said voltage regulating circuit.

9. Apparatus according to claim 8 wherein said reactor means comprises three reactors, each connected in parallel with a different one of said current boost transformer secondary windings.

10. Apparatus according to claim 9 wherein said reactors comprise linear reactors having gapped magnetic circuits.

* * * * *